(12) United States Patent
Schmidt et al.

(10) Patent No.: US 8,256,526 B2
(45) Date of Patent: Sep. 4, 2012

(54) APPARATUS AND A SYSTEM FOR PROVIDING GUIDANCE CONTROL FOR PULL TYPE TONGUED IMPLEMENTS

(75) Inventors: Eugene H. Schmidt, Madrid, NE (US); Marlin W. Unruh, Madrid, NE (US)

(73) Assignee: A.I.L., Inc., North Platte, NE (US)

( * ) Notice: Subject to any disclaimer, the term of this patent is extended or adjusted under 35 U.S.C. 154(b) by 960 days.

(21) Appl. No.: 12/217,639

(22) Filed: Jul. 8, 2008

(65) Prior Publication Data

US 2010/0006308 A1    Jan. 14, 2010

(51) Int. Cl.
*A01B 59/06* (2006.01)

(52) U.S. Cl. ........ 172/446; 172/439; 172/443; 172/449; 701/213

(58) Field of Classification Search .......... 701/213–215; 340/988; 172/439, 443, 446, 449, 450, 272; 280/460.1, 461.1; 414/703, 723
See application file for complete search history.

(56) References Cited

U.S. PATENT DOCUMENTS

| | | | |
|---|---|---|---|
| 4,133,552 A * | 1/1979 | Sheine | 280/455.1 |
| 4,681,335 A * | 7/1987 | Ledermann et al. | 280/446.1 |
| RE34,080 E | 9/1992 | Schmidt | |
| 5,150,849 A | 9/1992 | Farrow et al. | |
| 5,240,079 A | 8/1993 | Schmidt | |
| 5,655,581 A * | 8/1997 | Craft | 144/24.12 |
| 6,631,916 B1 * | 10/2003 | Miller | 280/468 |
| 6,865,465 B2 * | 3/2005 | McClure | 701/50 |
| 2003/0085047 A1 * | 5/2003 | Ollefs | 172/447 |
| 2006/0016611 A1 * | 1/2006 | Chauvel | 172/439 |
| 2010/0198444 A1 * | 8/2010 | Jensen | 701/26 |

FOREIGN PATENT DOCUMENTS

| | | | |
|---|---|---|---|
| DE | 3129537 A1 * | 2/1983 | |
| DE | 3427432 A1 * | 2/1986 | |
| FR | 2570244 A1 * | 3/1986 | |
| WO | WO 8810063 A1 * | 12/1988 | |

* cited by examiner

*Primary Examiner* — Alicia Torres
(74) *Attorney, Agent, or Firm* — Greer, Burns & Crain, Ltd.

(57) ABSTRACT

An apparatus for positioning a pull type farm implement has an elongated tongue being drawn by a motor vehicle having a vehicle hitch on the rear end thereof configured for attachment to the tongue, the apparatus including a hydraulic hitch mechanism configured to have one end portion attached to the vehicle hitch and an opposite end portion configured to be attached to the tongue of the implement in a non-pivoting manner, the hitch mechanism having at least one hydraulic cylinder for selectively adjusting the lateral position of the front end of the tongue. An optional GPS is operable to detect the position of the tool bar relative to the desired path and repeatedly generate position signals and apparatus for controlling the hydraulic hitch mechanism to adjust the lateral position of the tongue so that the implement follows the desired path of movement in response to the GPS signals.

20 Claims, 14 Drawing Sheets

FIG. 11

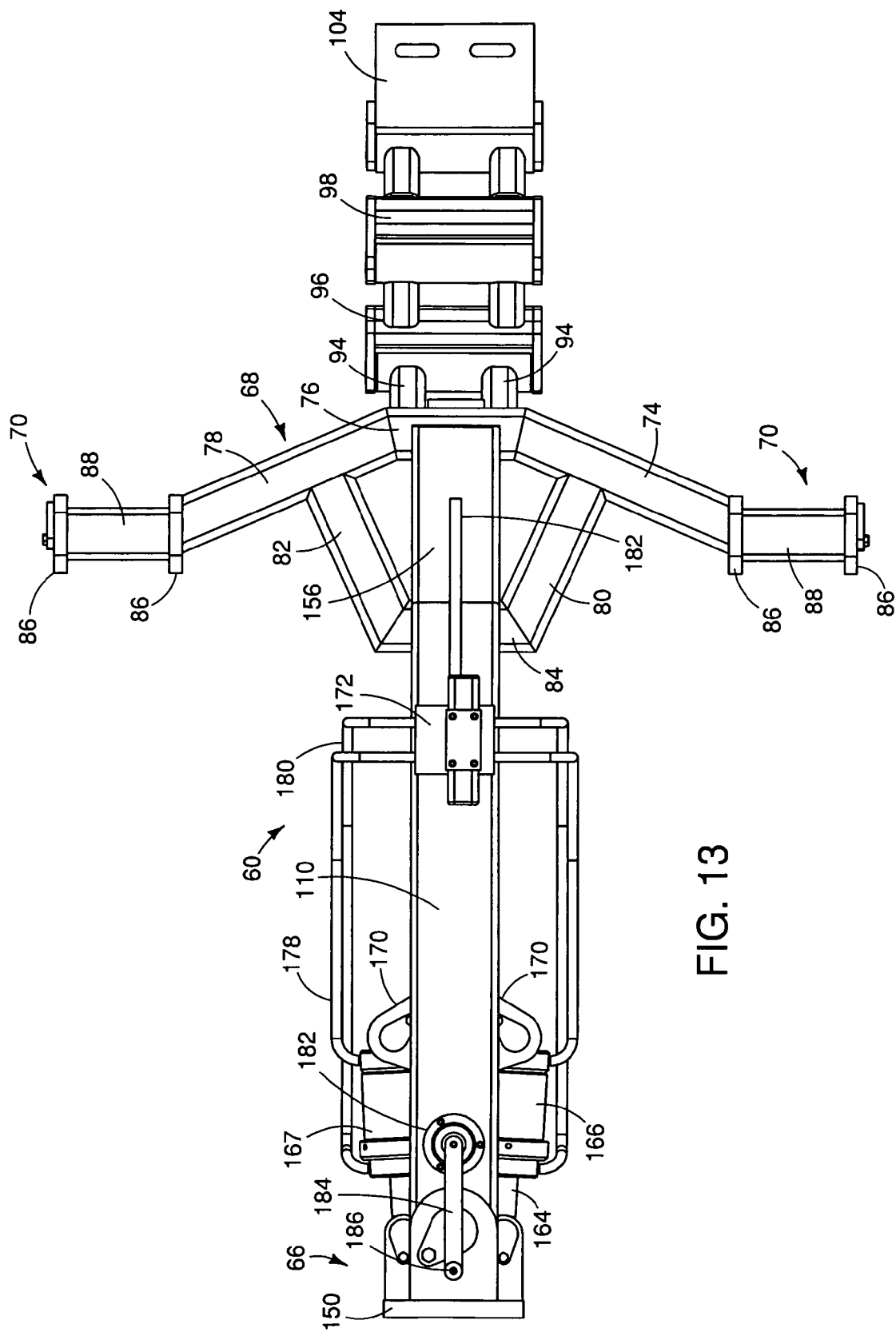

APPARATUS AND A SYSTEM FOR PROVIDING GUIDANCE CONTROL FOR PULL TYPE TONGUED IMPLEMENTS

BACKGROUND OF THE INVENTION

The present invention generally relates to guidance control systems for implements that trail a motor vehicle.

In the farming industry, guidance systems for controlling the position of trailing implements, particularly those which are mounted to the three point hitch of a motor vehicle, have been developed and marketed for many years. The design of some of the types of systems has limited their effectiveness and accuracy with regard to positioning the implement. Guidance systems that have exhibited reliable and accurate operation are those manufactured and marketed by Sunco of North Platte and Madrid, Nebr.

The Sunco systems are marketed under the trademark AcuraTrak® have exhibited superior operating characteristics for guiding many types of trailing implements that are pulled by farm tractors. While some guidance systems are designed to be more concerned with controlling the tractor itself, the AcuraTrak system is designed to control the lateral position of an implement relative to the tractor that is pulling it, with the focus being on proper positioning of the implement along a desired path as the implement is pulled through a field during operation. The currently marketed Acura Track guidance systems operate in a manner based on principles that are set forth in U.S. Pat. Nos. 5,240,079, 5,150,849 and Re. 34,080, and are generally applicable to certain aspects of the present invention. All of these patents are specifically incorporated by reference herein.

The guidance systems disclosed in those patents utilize a wand mechanism associated with the implement which is dragged along the ground and is a common means for sensing the relative position of the implement relative to the rows. The wand is mounted on the implement in a manner that it is positioned in the middle of the distance between two adjacent rows. The midpoint between two rows is usually the lowest point between the rows, since a cultivating operation tends to move dirt from the middle toward the plants, for example. The wand is angularly moveable so that its angular position can change depending upon whether the implement is oriented in the center between adjacent rows or is offset from the center. Thus, if the implement is moving to one side of center to the other, the angular position of the wand will change and provide corrective signals for controlling the guidance system to alter the lateral position of the implement relative to the rows.

It should be easily understood that if an operator is cultivating a crop that has already reached a stand, or is planting or marking out rows, or the like, the difficulty does not reside in the operator being able to keep the tractor between the rows without the tractor wheels crushing the crop, but rather keeping the implement from getting too close to the crop which could, in the case of cultivation, result in damage to the roots of the crop by the cultivator blades. In the case of marking out rows, it is obviously desirable to have uniform rows.

With the advent of global positioning systems (GPS), it has been the desire, if not the goal of many in the agricultural industry to use GPS systems as the navigation tool to control tractors during a planting or other farming operation to make and/or follow rows that are properly aligned in a field and relative to other rows. Improvements in the GPS signals now enables positioning within a tolerance of an inch or less during a farming operation, and also enables accurate mapping of paths that a vehicle should travel.

While such guidance systems as described above are effective, particularly when coupled with GPS systems and are connected to a three-point hitch of a tractor or other type of motor vehicle, there are still significant challenges to existing guidance systems that operate in connection with an implement with an elongated tongue having a forward end that is pivotally connected to a drawbar, and the rear end fixedly connected to the body of the implement and preferably to the tool bar. Such an implement will be referred to herein as a "tongued implement".

Providing guidance of such tongued implements has been attempted by forcing the drawbar laterally relative to the tractor, but such forced lateral movement simply does not work well, particularly on sloped land where gravity creates side forces that dramatically affect the operation of the tractor and drawn implement combination.

While other prior solutions included U.S. Pat. No. 5,025,866 which had a tongue driven by a hydraulic cylinder at the rear end of the tongue where it is pivotably connected to the tool bar and the angle is changed by operation of a hydraulic cylinder, that solution is impractical for extremely large implements that may cover 20 to 30 rows of crops in a single swath, because of the extremely large forces that would be generated by implements of such size on a pivotable connection between the tongue and the tool bar.

The difficulty that is experienced in the operation of tongued implements being drawn by a tractor is described in connection with FIGS. 1 and 2 where a tractor, indicated generally at 20, is pulling an implement, indicated generally at 22, along a path 24 that has a down slope to the right as indicated by the arrow, such as would be the case on a side hill. The down slope is defined to be where the tractor 20 is located in FIG. 1 and extends only to the position slightly ahead of the tool bar 32, with the implement 22 being on level ground.

The tractor has rear wheels 26, front wheels 27 and a drawbar 28 that is connected to the tractor at 30 and is kept from pivoting around connection 30 by conventional hitch structure so that it is oriented along the center line of the tractor as indicated. The implement 22 has a tool bar 32 to which eight planter row units or other implements 34 are attached, with the implement riding on a frame structure (not shown) to which wheels 36 are mounted. The implement 22 has a tongue 38 rigidly attached to the tool bar 32 and is preferably supported by braces 40 to insure that the 90° angle between the tongue and the tool bar is maintained during operation. The front end of the tongue is pivotally connected to the drawbar 28 at 42 which defines the pull point for the implement.

As shown in FIG. 1, because of the slope that was encountered during forward movement, the tractor rear wheels 26 have started sliding to the right or down the hill, which moves the pull point to the right pulling the implement 22 downhill before the implement gets to the slope. As the tractor rear wheel 26 slides to the right, the pull point 42 is pushed to the right and as shown in FIG. 2, the implement remains off track, i.e., the wheels 36 do not follow the track 24 as long as the rear wheels 26 of the tractor 20 are off track.

As previously indicated, prior ineffective guidance attempts included forcing the drawbar laterally from side to side. This is shown in FIG. 3 where the drawbar 28 has been pivoted around the connection 30 to one side by 15 inches. Thus, the pull point defined by the connection 42 is 15 inches to the right of the center of the tractor which has the tendency to pull the rear of the tractor off the path and significantly increases the side load on the tractor which results in substantial inefficiency.

Such movement of the drawbar from side to side in the manner shown in FIG. 3 is known to be ineffective in steering the implement and such drawbar steering simply does not work as is evidenced by the fact that there are few commercial products in the marketplace that attempt to utilize such operation for providing guidance. It is important that the pull point be maintained generally in the center of the tractor to have effective and efficient operation.

SUMMARY OF THE INVENTION

Embodiments of the present invention are directed to apparatus for positioning a pull type farm implement which has an elongated tongue fixedly attached to an elongated transverse tool bar while being drawn by a motor vehicle moving generally along a desired path, the vehicle having a vehicle hitch on the rear end thereof configured for attachment to the front end portion of the tongue, the apparatus comprising a hydraulic hitch mechanism having an elongated main frame, the mechanism being configured to have one end portion attached to the vehicle hitch and an opposite end portion configured to be attached to the tongue of the implement in a non-pivoting manner, the hitch mechanism having at least one hydraulic cylinder attached to the main frame for selectively adjusting the lateral position of the front end of the tongue relative to the vehicle hitch in a manner whereby the pull point of the motor vehicle is relatively unchanged, a global positioning system (GPS), the GPS including a receiver and an antenna, the antenna being mounted on the implement, the GPS being operable to detect the position of the tool bar relative to the desired path as the vehicle moves forwardly generally along the desired path and repeatedly generate signals that are indicative of the detected position; and means for controlling the hydraulic hitch mechanism to adjust the lateral position of the front end of the tongue so that the implement follows the desired path of movement in response to the GPS signals.

Embodiments of the invention are also directed to a method of maintaining a centered pull point of a motor vehicle with a vehicle hitch for pulling a farm implement having a tongue fixedly and non-rotationally attached to a transverse tool bar when the rear end of the motor vehicle pulling the farm implement becomes laterally offset relative to a desired path the motor vehicle is intending to traverse, comprising the steps of providing a hydraulic hitch mechanism having an elongated main frame, the mechanism being configured to have one end portion pivotably attached to the vehicle hitch and an opposite end portion configured to be pivotably attached to a tongue mount that is attached to the tongue of the implement in a non-pivoting manner, the hydraulic hitch mechanism moving the front end of the tongue in a direction opposite the direction that created the lateral offset by an amount generally equal to the amount of the offset.

DESCRIPTION OF THE DRAWINGS

Figure 11:
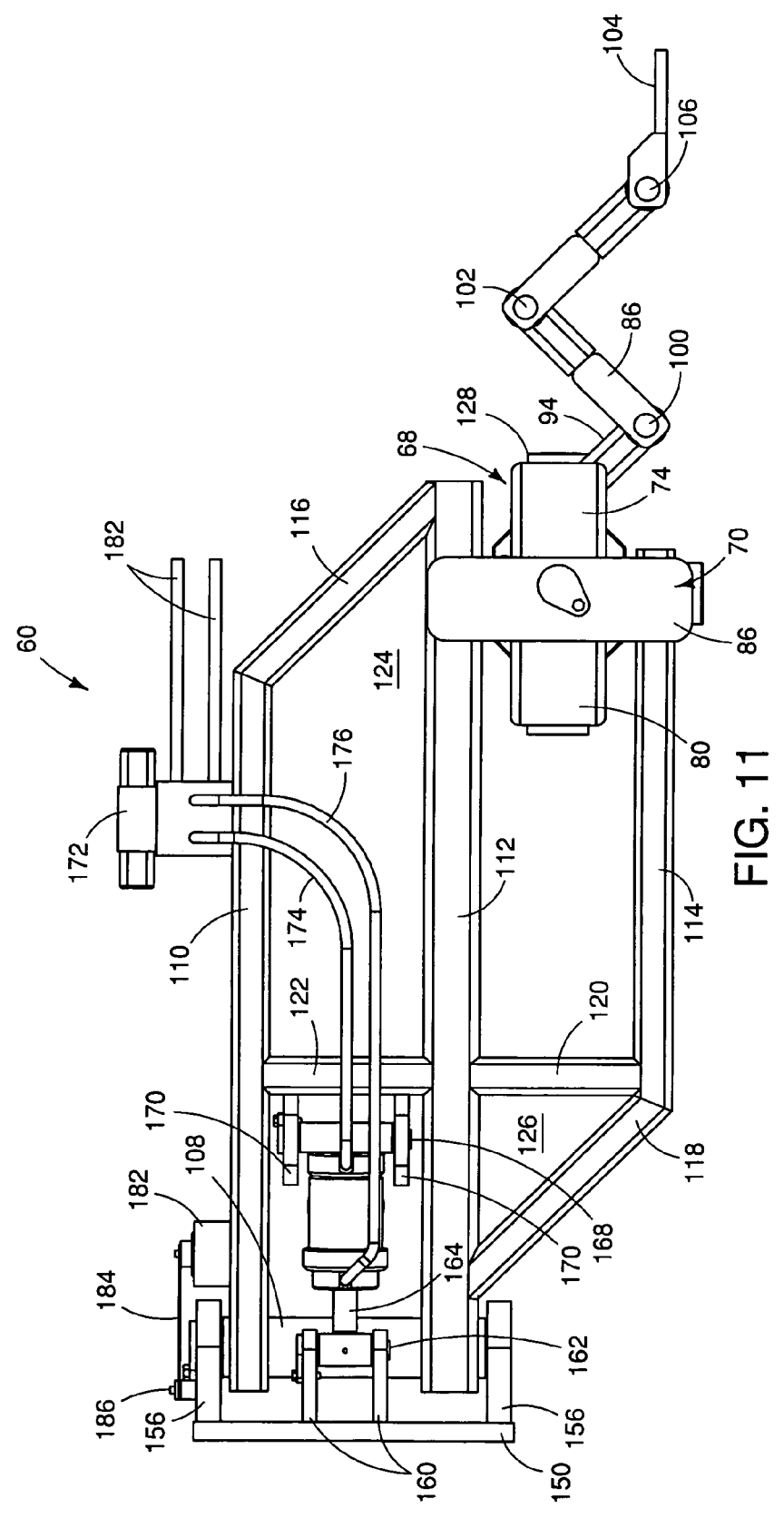

FIG. 11 is a side view of the mechanism shown in FIG. 10;

FIG. 13 is a top view of the mechanism shown in FIG. 10;

DETAILED DESCRIPTION

Broadly stated, a guidance control system and apparatus for farm tractors in combination with a trailing implement of the type which has a tongue rigidly attached to the body of the implement, which is preferably a tool bar as shown and described herein. As previously indicated, such an implement is referred to herein as a "tongued implement". It is contemplated that the guidance control system could be used with vehicles other than farm tractors and could have general applicability to any such vehicle that would utilize a vehicle hitch to which some type of tongued implement could be attached where side to side adjustability for controlling the path of movement of the implement is desired.

However, the system is particularly useful in guiding implements that trail a tractor including but not limited to those used in row crop farming. The preferred embodiment of the system disclosed herein is particularly configured for use with a 2-point vehicle hitch, in conjunction with one or more coulter discs.

The preferred embodiment of the present invention is directed to a system which is configured to operate to have a tongued implement being pulled by a vehicle accurately follow a desired path that is defined in some manner and stored in a memory of a GPS system. The preferred embodiment has a GPS antenna that is mounted either to the forward end of the implement being drawn, such as on the tool bar of many implements and it is the operation of the GPS system to generate correction signals when the implement veers off of the desired path. It should be understood that while GPS control is preferred, the system can provide guidance for implements that use the wand technology that has been described herein.

The preferred embodiment of the present invention effectively tracks the position of the implement along the desired path and makes corrections to the orientation of the implement relative to the tractor. Significantly, if the tractor is traveling along a path that is generally within the bounds of correction by the implement, the implement will keep moving along the desired path.

Figure 1:
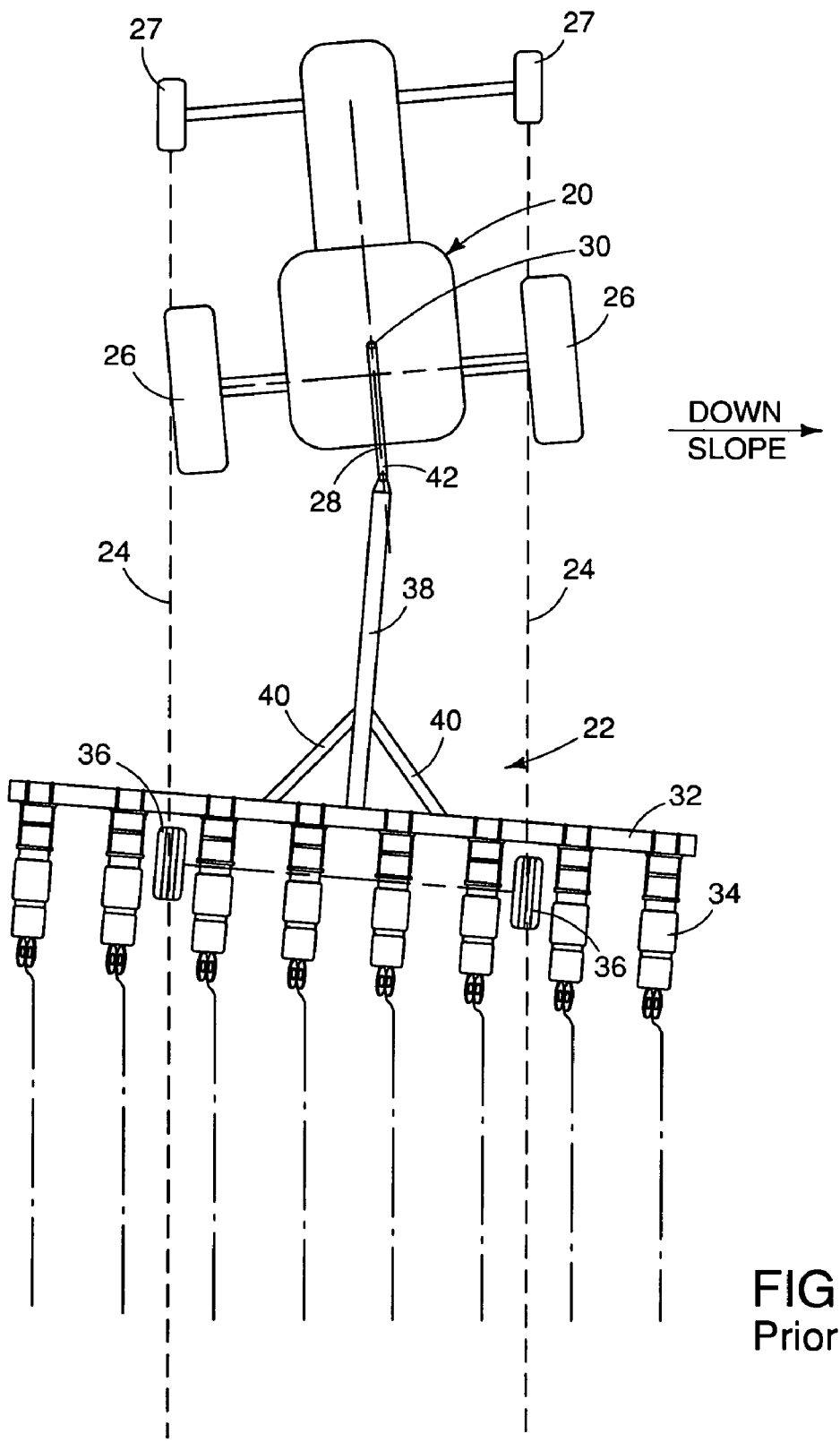
FIG. 1 is a greatly simplified top view of a tractor pulling a tongued implement wherein the back of the tractor is sliding down a slope to the right and departs from the desired path.
Figure 2:
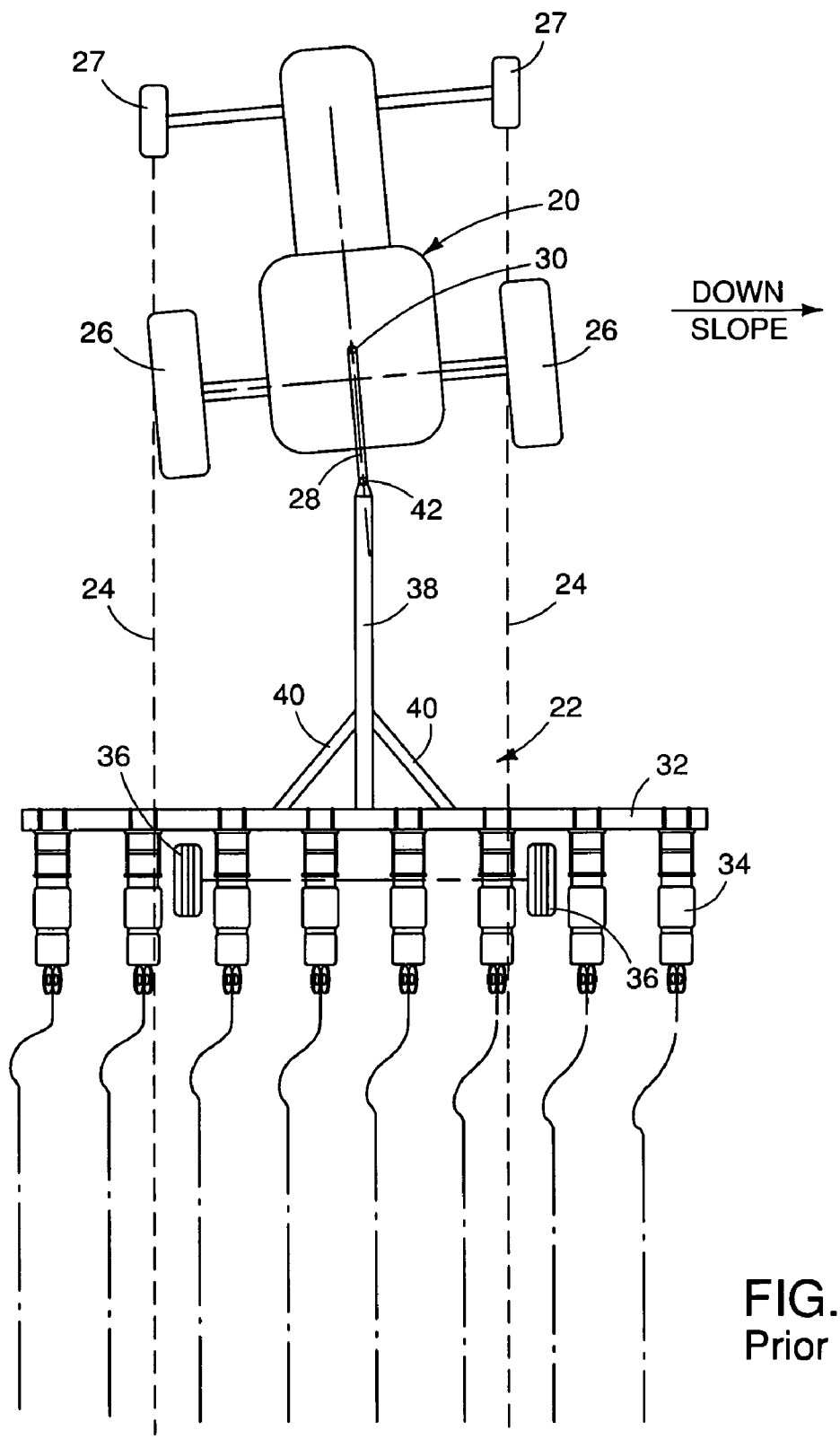
FIG. 2 is a view similar to FIG. 1 illustrating the tractor and the implement being off of the desired path.
Figure 3:
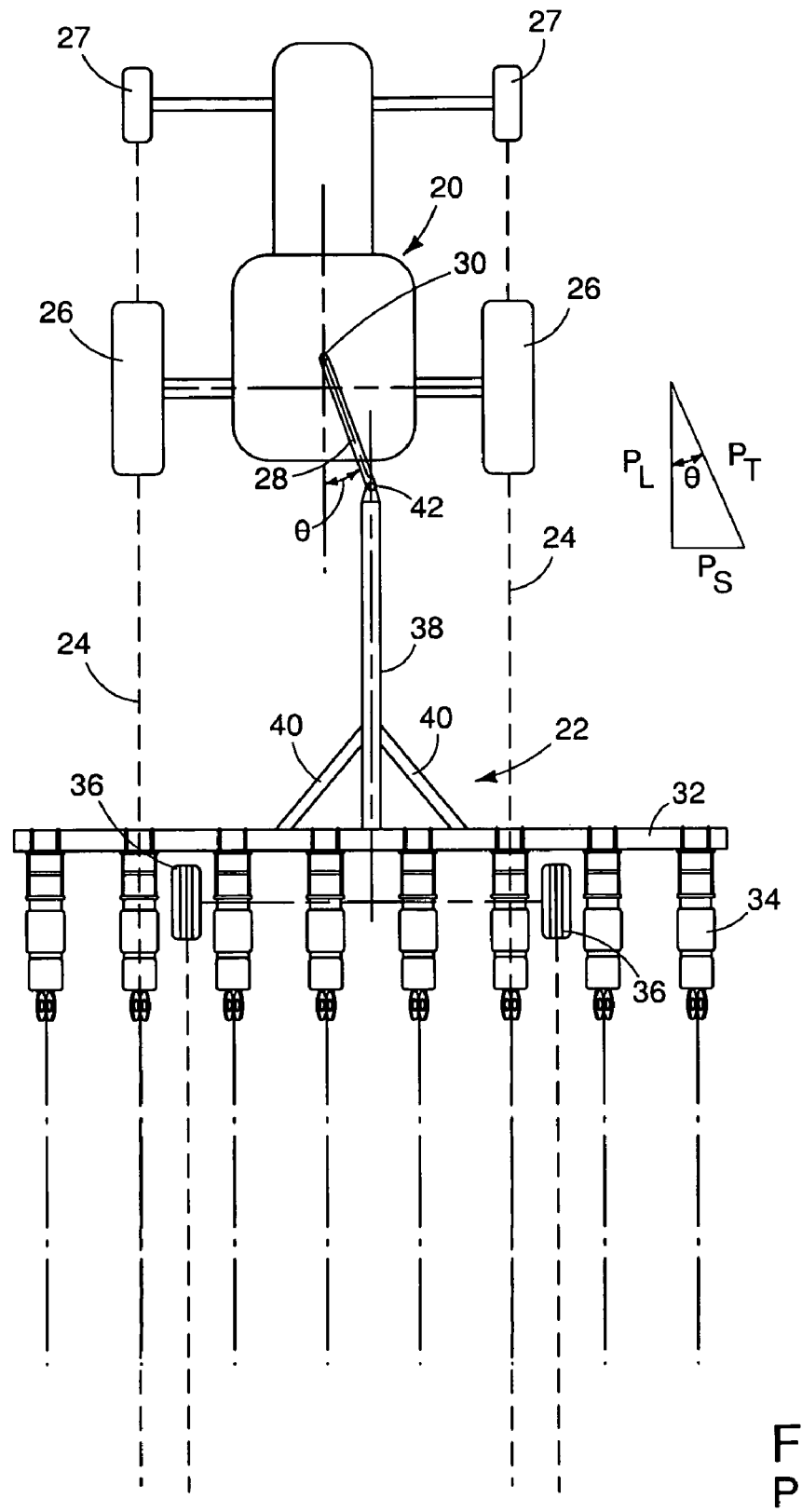
FIG. 3 is a view similar to FIG. 2, but illustrating the implement being off of the desired path as a result of swinging the drawbar to a laterally offset position.

Referring to the drawings, and particularly FIGS. 4-9, which comprise a sequence of drawings indicating the operation of the present invention which is a system and apparatus for providing a guidance capability for a tongued implement that is being pulled by a motor vehicle such as a tractor. The reference numbers that were used in FIGS. 1-3 are also employed in FIGS. 4-9 where they refer to common elements. However, elements given reference numbers 50 and above are not found in the prior art representation shown in FIGS. 1-3, but are present in the discussion and illustration of the embodiments of the present invention that are shown in these drawings. Thus, the tractor 20 has a two-point hitch which includes side arms 50 and 52 which are respectively connected to the bottom of the tractor approximately at points 54 and 56 and are shown converging together by the dotted lines at a point 58 which represents the pull point of the tractor.

By the nature of the design of the preferred embodiment, the pull point stays in line with the center of the tractor. It is important that the implement guidance not influence the tractor navigation. If the tractor has a separate guidance system, it is desirable that it be "decoupled" from the implement guidance system, and if that is done, both guidance systems benefit and can operate at their full potential. In the preferred embodiment, and as will be described, the hydraulically controlled cylinders operate to adjust the tongue of the implement, which is displaced or separated by a considerable distance from the tractor. This tends to decouple the implement guidance system in that the pull point is not appreciably changed and does not affect the tractor navigation.

In this regard, and referring to the prior art representation of FIG. 3, if the drawbar 28 is swung 15 inches to the right of center, then the angle θ of the drawbar relative to the center line of the tractor is 19.67°. Empirically, the side load $P_S$ is equal to the implement load $P_L \times \tan\theta$ or $0.357\ P_L$. The total load $P_T$ is equal to $P_L/\cos 19.56°$ which equals $P_L/0.942$ or $1.062 P_L$. In contrast, an offset of 15 inches using the preferred embodiment of the present invention produces an angle θ of 5.26° which results in a total load $P_T$ equal to $1.004\ P_L$ (see FIG. 4). This means that the side load has not changed nearly at all compared to 1.062. The preferred embodiment of the present invention provides effective guidance control for a pull type hitch and maintains the pull point substantially in the center of the tractor even when a lateral correction of 15" is being made.

Returning to FIG. 4, a hydraulic hitch mechanism, indicated generally at 60, is attached to the arms 50 and 52 as well as to the tongue 38' which is similar to the tongue 38 shown in FIGS. 1 and 3 except that it has a flat end portion for connection to a rear end portion of the hydraulic hitch mechanism 60.

With that introduction and before describing the sequence of operations shown in FIGS. 4-9, reference is made to the hydraulic hitch mechanism shown in FIGS. 10-15. Referring initially to the perspective view of FIG. 10, the hydraulic hitch mechanism 60 has a vehicle mount, indicated generally at 62, a main frame, indicated generally at 64, and a tongue mount, indicated generally at 66. The vehicle mount 62 is configured to be attached to a two-point hitch of a farm tractor and the opposite end of the hydraulic hitch mechanism has the tongue mount 66 for attachment to the tongue 38' shown in FIG. 4.

The vehicle mount 62 has a two-point mount frame 68 that has pin brackets, indicated generally at 70, at the outer end thereof, each of which has a cylindrical pin 72 that are configured to engage the conventional receiving ends of the two-point side arms 50 and 52 of the tractor. It should be understood that the entire hydraulic hitch mechanism may be pivoted around the pins 72 that are fitted into the receiving ends of the arms 50 and 52. While the mount frame 68 is shown to be a three interconnected sections 74, 76 and 78, that are angled relative to one another, the two-point mount frame 68 also has a rear support frame comprised of side sections 80 and 82 and a bridging section 84. The sections 74 through 84 are preferably made of 4"×4"×⅜" thick steel tube stock that are welded together as well as welded to the pin brackets which are also substantial and preferably made with approximately ⅜" steel plate side members 86 and upper and lower square steel tube stock 88. The sections 74 through 84 define a pocket, indicated generally at 90, in which a U-joint 92 is mounted (see FIGS. 14 and 15). The vehicle mount also has a front lateral stiffener linkage, indicated generally at 93, which is connected to the center section 76 preferably by welding. The linkage 93 has connection portions 94 which connect to center section 76 and to a first link 96 which in turn is connected to a second link 98 in a manner whereby each of the links are pivotable about a pin 100 and 102. Similarly, the link 98 is pivotally connected to a drawbar plate 104 by a pin 106.

It is important to the operation of the hydraulic hitch mechanism that the vehicle mount 62 not move laterally relative to the tractor. It is for this reason that the lateral stiffener linkage 93 is provided and it is bolted to the underside of the tractor by bolts that extend through slots 108 in the drawbar plate 104. The linkage 93 has a relatively wide width to provide the necessary stiffness to the hydraulic hitch mechanism 60 and the pivotable linkage 93 provides the necessary stiffness in a lateral direction but enables the mechanism 60 to pivot around the pins 72 in the two-point hitch arms 50 and 52.

Main frame 64 is manufactured from rectangular steel tube that is preferably approximately 3"×6"×⅜" steel stock which is preferably welded together. It comprises a top strut 110, a middle strut 112 and a lower strut 114. The top strut 110 has an inclined front portion 116 and the lower strut has an inclined rear portion 118. Vertical struts 120 and 122 are provided between adjacent horizontal struts as shown and a stiffener plate 124 preferably made of at least ¼" steel stock is welded between the upper strut 110 including the incline portion 116, the vertical strut 122 and the middle horizontal strut 112. Similarly, a triangular stiffener plate 126 is provided between middle strut 112, lower strut portion 118 and vertical strut 120. The space between the middle strut 112 and lower strut 114 is sufficient so that it clears both the top and bottom of the frame section 84 enabling the main frame 64 to be pivoted in a generally horizontal direction by virtue of its connection to a vertical set of pins in the U-joint 92.

Figure 10:
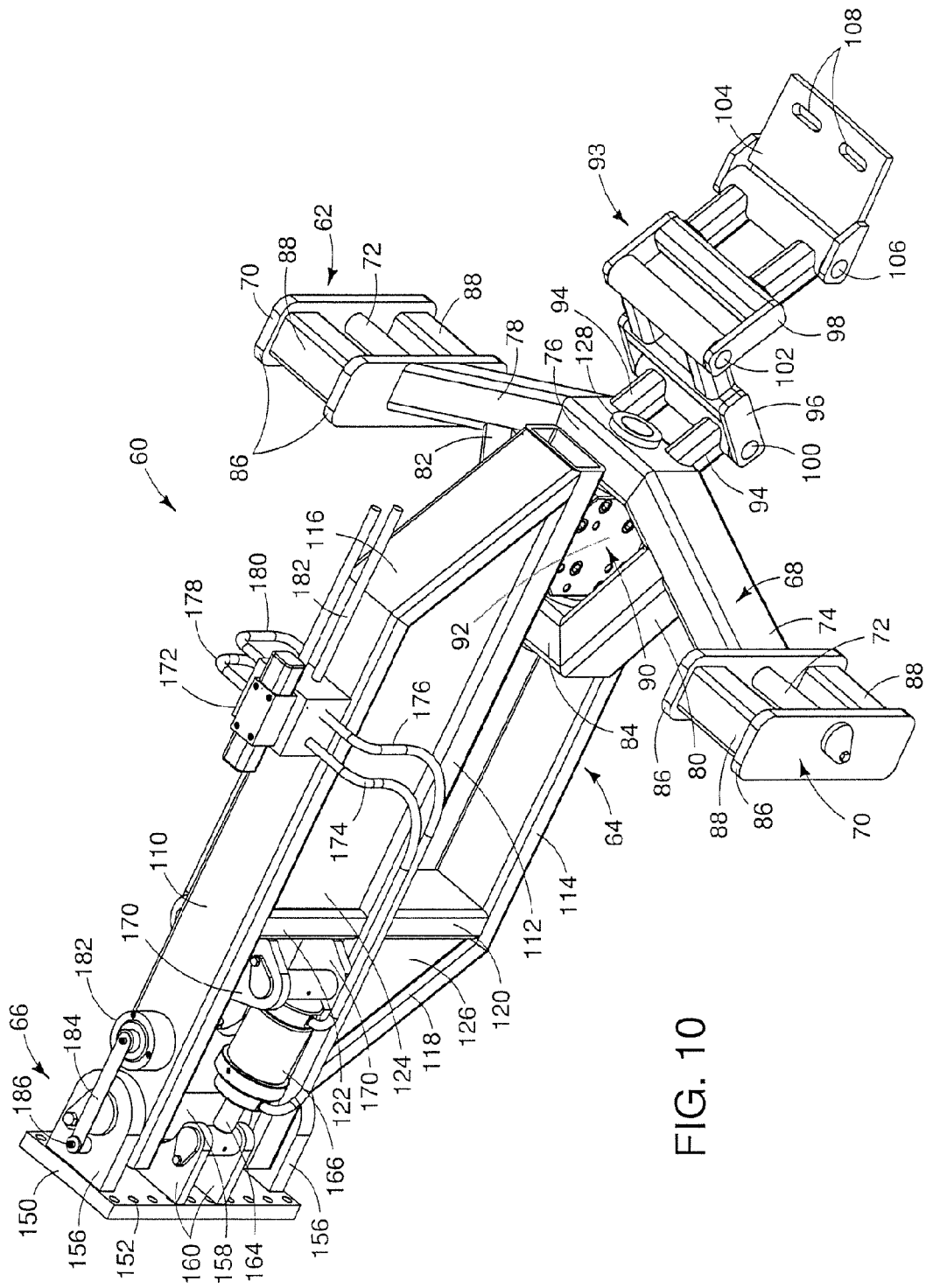
FIG. 10 is a perspective view of the hydraulic hitch mechanism embodying the present invention.
Figure 12:
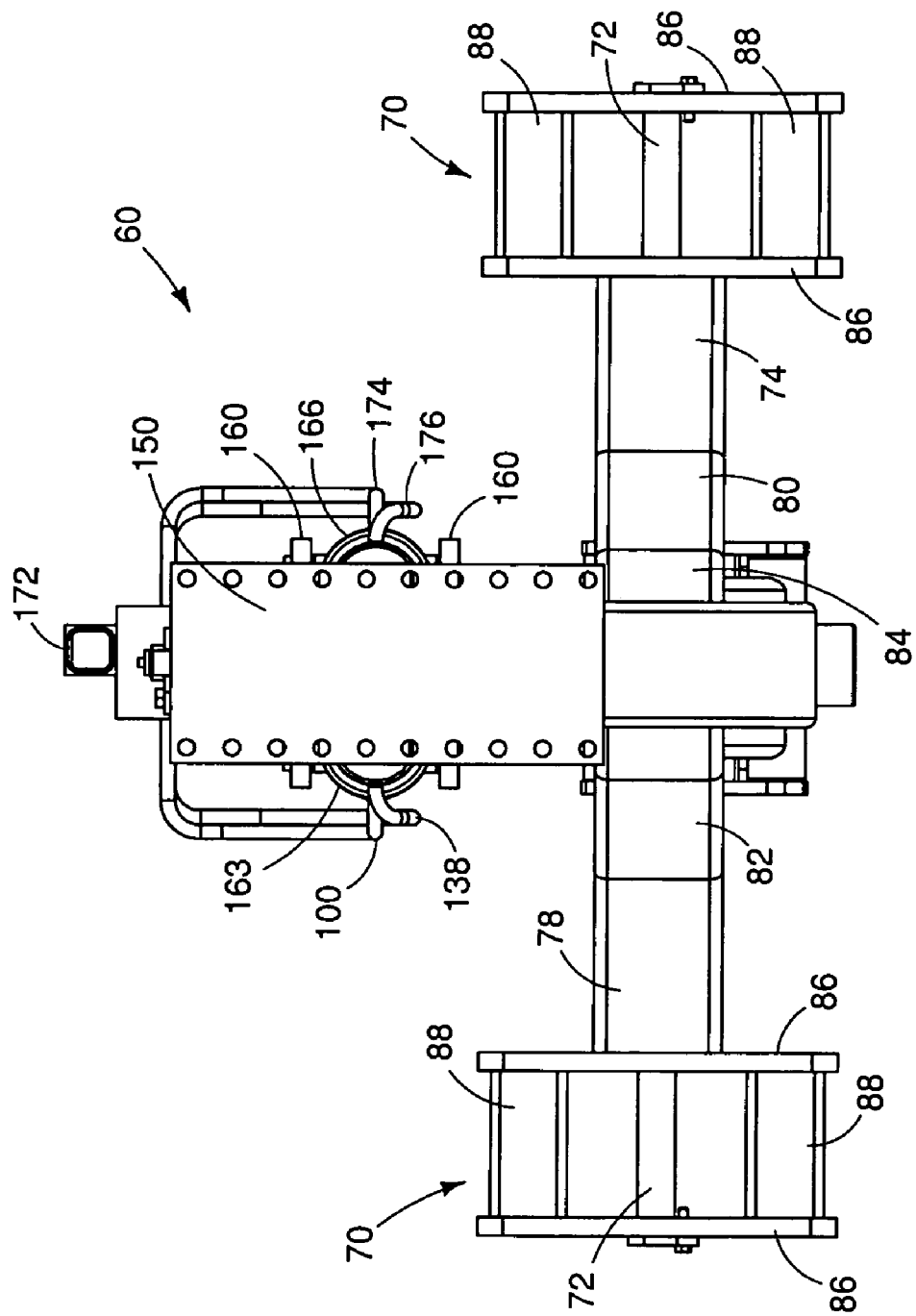
FIG. 12 is a front view of the mechanism shown in FIG. 10.

As shown in FIG. 10, the mount frame section 76 has a cylindrical collar 128 extending therethrough in which a pin of the U-joint 92 is located. A similar collar is provided in the section 84 which enables the main frame 64 to pivot around the axis of the collar 128 during operation.

Figure 15:
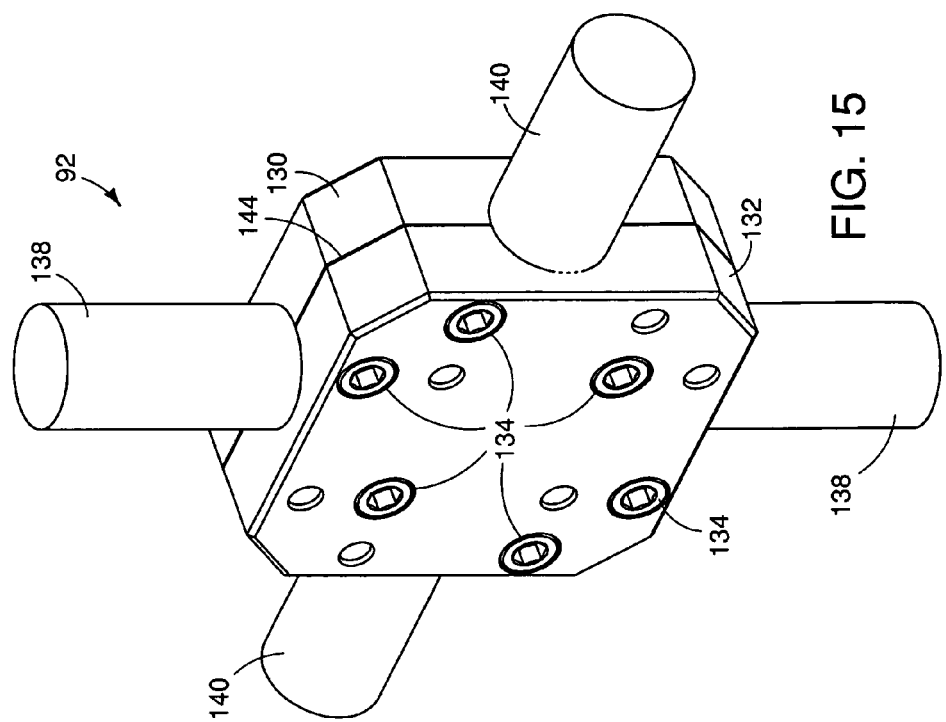
FIG. 15 is a perspective view similar to FIG. 14, but showing the entire U-joint mechanism.
Figure 14:
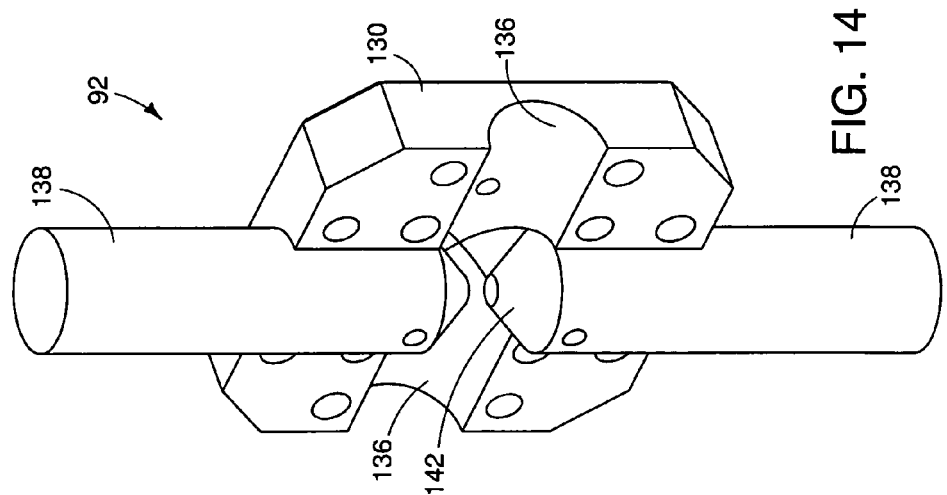
FIG. 14 is a perspective view of a portion of the U-joint that is a component of the mechanism shown in FIG. 10.

Turning to FIGS. 14 and 15, the U-joint 92 is illustrated and has two half sections 130 and 132 which are bolted together by bolts 134. As shown in FIG. 14, each of the sections 130 and 132 are identical in structure and have semi-cylindrical recesses 136 for receiving vertical pins 138 and horizontal pins 140. The pins have a truncated conical inner end 142 which enables them to be placed between the half sections 130 and 132 in almost, if not contacting relation. The thickness of the half sections 130 and 132 is preferably such that there is a small gap 144 at the interface so that when the bolts 134 are tightened, they firmly hold the pins 138 and 140 in position. The pin 140 has an outside diameter approximately equal to the inside diameter of the collar 128 so that rotation is possible. The main frame 64 preferably has similar collars in the middle strut 112 and lower strut 114 for receiving the vertical pins 138.

As best shown in FIGS. 10 and 15, the axes of the pins 72, 138 and 140 and all extend through a common point. The advantages of the design is that the three pivot points share a common center axis. Thus each joint pin has only the actual stress load applied and is not compounded by being off center. The vertical U-joint pins 138 will only have the implement pulling force, and no shear stress due to being off center as in other designs. The horizontal U-joint pins 140 will only have the tongue weight. The two point pins 72 will have the tongue weight when the implement is raised, and pulling stress when the implement is engaged with the ground. There is no extra stresses introduced, as there would be if the pins were offset. With offset pivot points the distance of the offset creates a magnitude of leverage stress besides the normal load stress on the pivot pins.

Figure 4:
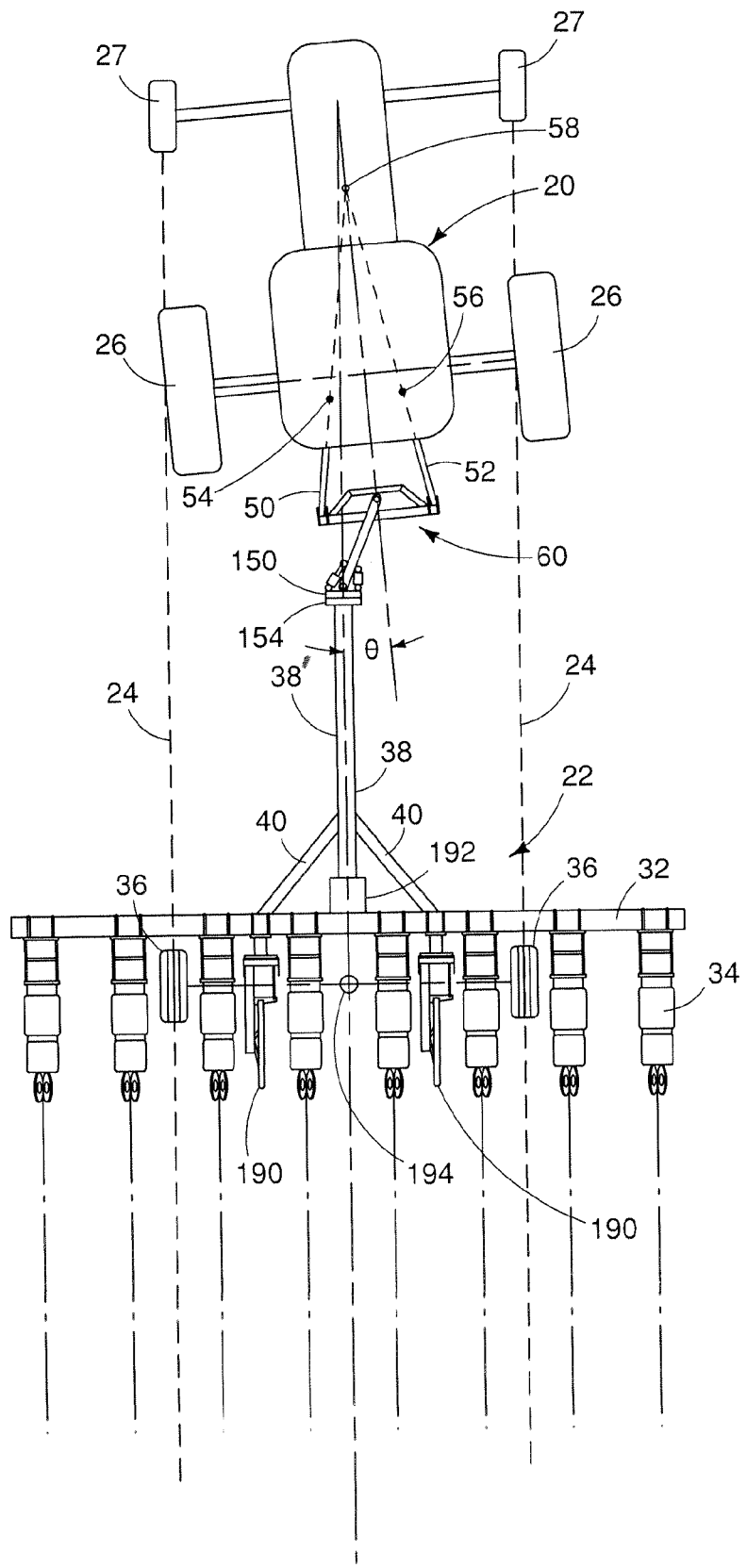
FIGS. 4-9 illustrate a sequence of positions of a tractor and trailing tongued implement together with the guidance system of the present invention providing correcting action during operation.

With regard to the tongue mount 66, it preferably has an interface plate 150 that is preferably flat and has a substantial surface area with a number of apertures 152 for bolting the interface plate to a similar tongue interface plate 154 that is preferably welded to the tongue 38' as shown in FIG. 4. The tongue mount 66 also has upper and lower flanges 156 that have an aperture for receiving a pivot pin (not shown) but located within hollow cylinder portion 158 that is welded between the upper strut 110 and the middle strut 112. The tongue mount 66 also has a pair of spaced side flanges 160 that are welded on opposite sides of the cylindrical section 158 and have an aperture for receiving a pin 162 (see FIG. 11) which interconnects a piston 164 of a hydraulic cylinder 166. While the cylinder 166 shown in FIG. 10 is located on the left side as viewed in that drawing, a similar cylinder 167 is provided on the opposite side of the main frame 64. The rear end of the cylinder is similarly connected by a pin 168 that is mounted between a pair of rear flanges 170 that are welded to the main frame 64.

The left hydraulic cylinder 166 is connected to a control valve 172 by lines 174 and 176 whereas the right hydraulic cylinder 167 is connected to the valve by lines 178 and 180. A source of hydraulic pressure preferably coming from the tractor to which the hydraulic hitch mechanism is attached is supplied through lines 182. It should be understood that when the left cylinder 166 is operated to extend the piston 164, the tongue mount 66 will rotate in a clockwise direction as viewed from the top and such rotation will also result in the piston of the cylinder 167 being retracted by a comparable amount. Thus, operation of the cylinders 166 and 167 cause the tongue mount 66 to rotate in either direction, which when connected to the tongue 38' causes the tongue to be laterally moved one way or the other in an amount controlled by signals from the GPS system to maintain the implement moving along the desired path as will be further explained. An angular sensor 182 is connected by an arm 184 to the tongue mount 66 at 186. The sensor 182 is preferably a Hall effect device, although other types of angular sensing mechanisms may be used.

Returning now to FIG. 4 which shows the hydraulic hitch mechanism 60 on the tractor and connected to the implement 22, the implement is also provided with a pair of stabilizing Coulter discs 190 which anchor the implement from sliding laterally during operation, so that when the tongue is moved relative to the tractor by the hydraulic hitch mechanism, the position of the tongue basically pivots around the Coulter discs 190 as is desired. The GPS antenna 192 is mounted preferably at or forwardly of the tool bar 32 and centered so that it is coextensive with the center of the implement draft which is identified at location 194.

As a result of the GPS guidance capability, it is evident from FIG. 4 that the rear wheels 26 are off the desired track 24, i.e., they are to the right as shown in the drawing while at this particular point in time, the front wheels 27 are on track. Also, because of the operation of the guidance system causing the hydraulic hitch mechanism to be in the position shown, the implement 22 is still on track inasmuch as the wheels are centered along the lines 24 which is indicative of the implement being on track. It is also important to note that the line through the center of the implement draft and through the tongue 38' extends forwardly to the pull point 58 which means that the tractor does not experience any significant side loading which is important for efficient operation of the tractor as well as the guidance system.

Figure 5:
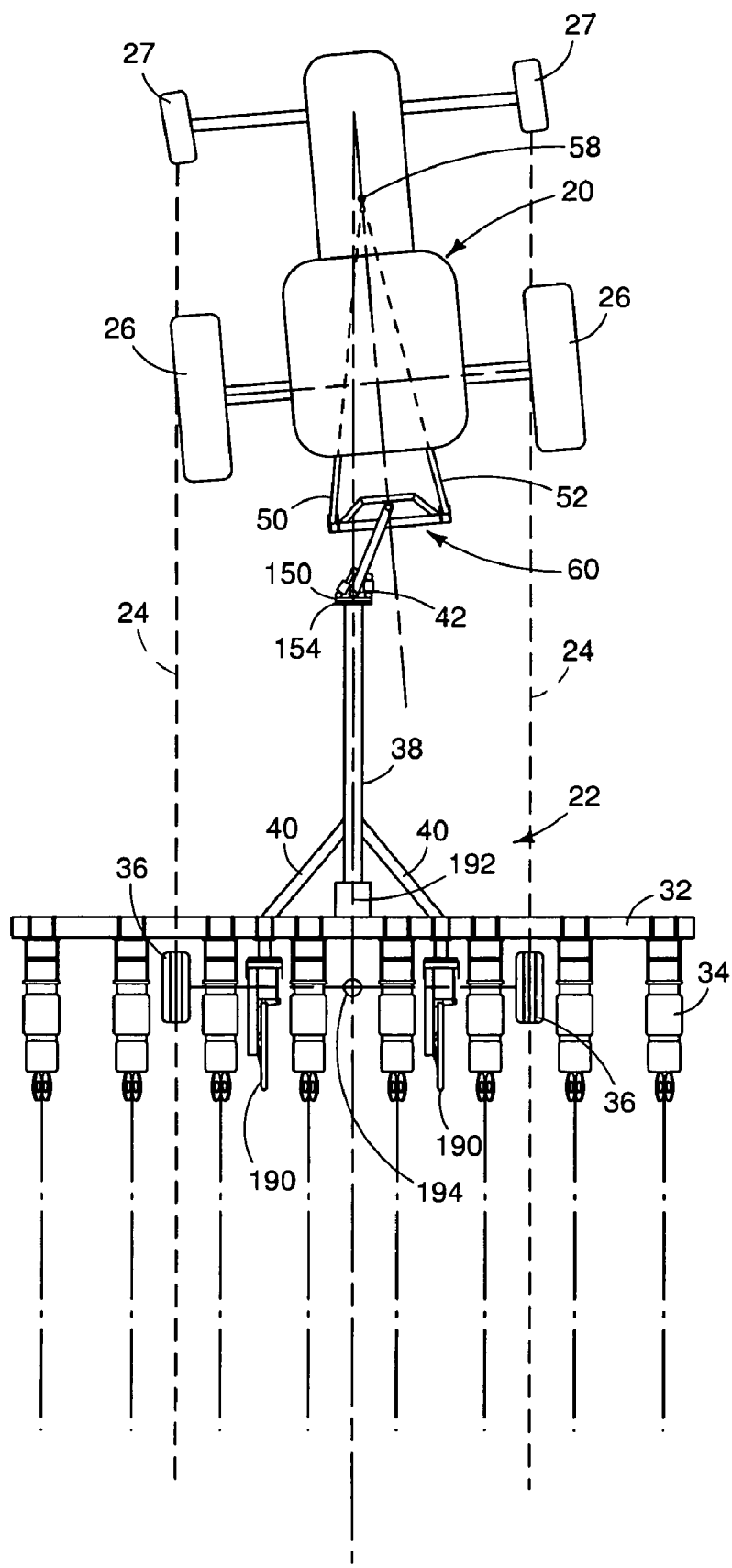

Referring now to FIG. 5, the front wheels 27 are turned left for the purpose of moving the tractor back on track and while this is happening, the guidance system maintains the implement on track as is indicated. The implement maintains its on track operation and side forces are not experienced by the tractor because the pull point is still substantially centered on the line of the tongue.

Figure 6:
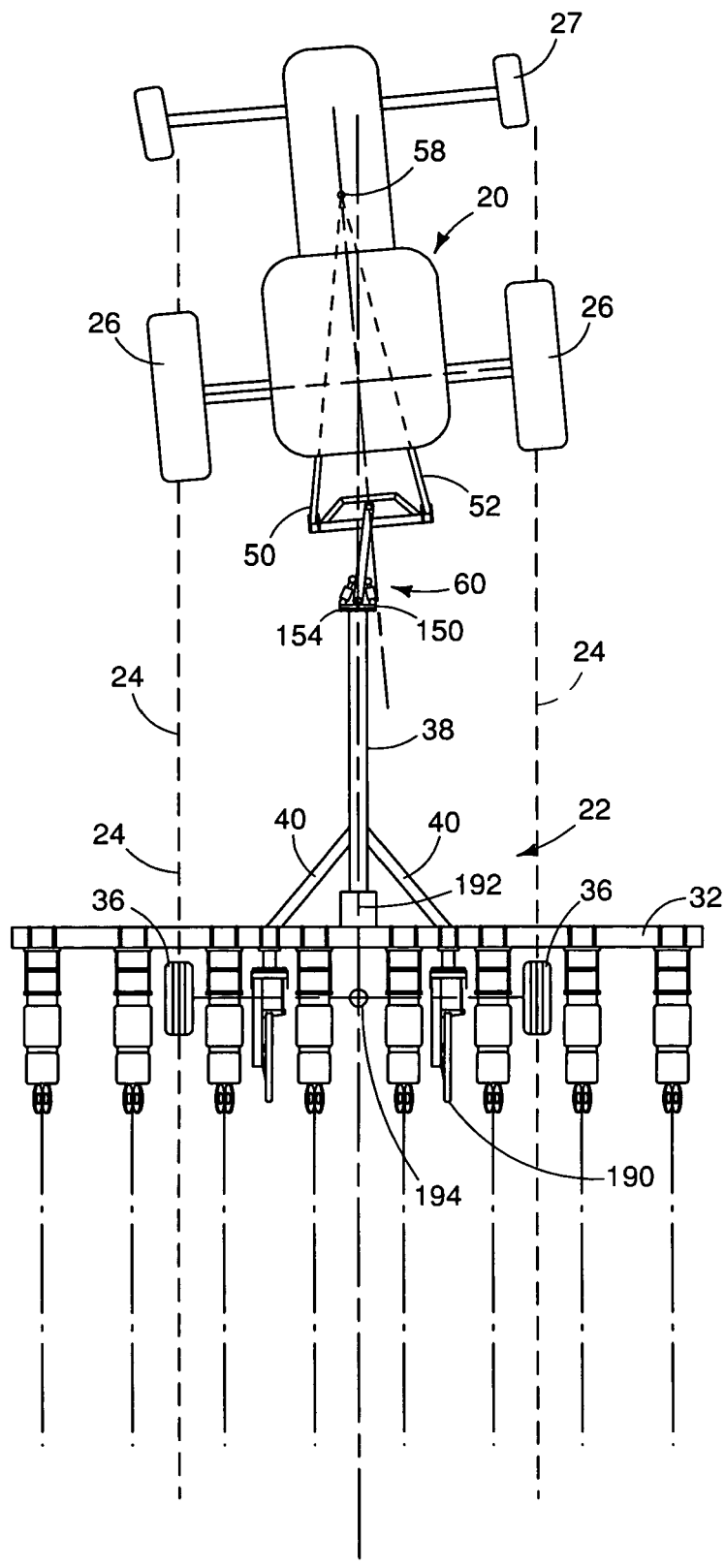

Referring to FIG. 6, the front wheels 27 have now traveled to the left of the correct track 24 while the rear wheels 26 have now returned to be on track and the hydraulic hitch mechanism 60 has adjusted to maintain the implement on track during this portion of the correction.

Figure 7:
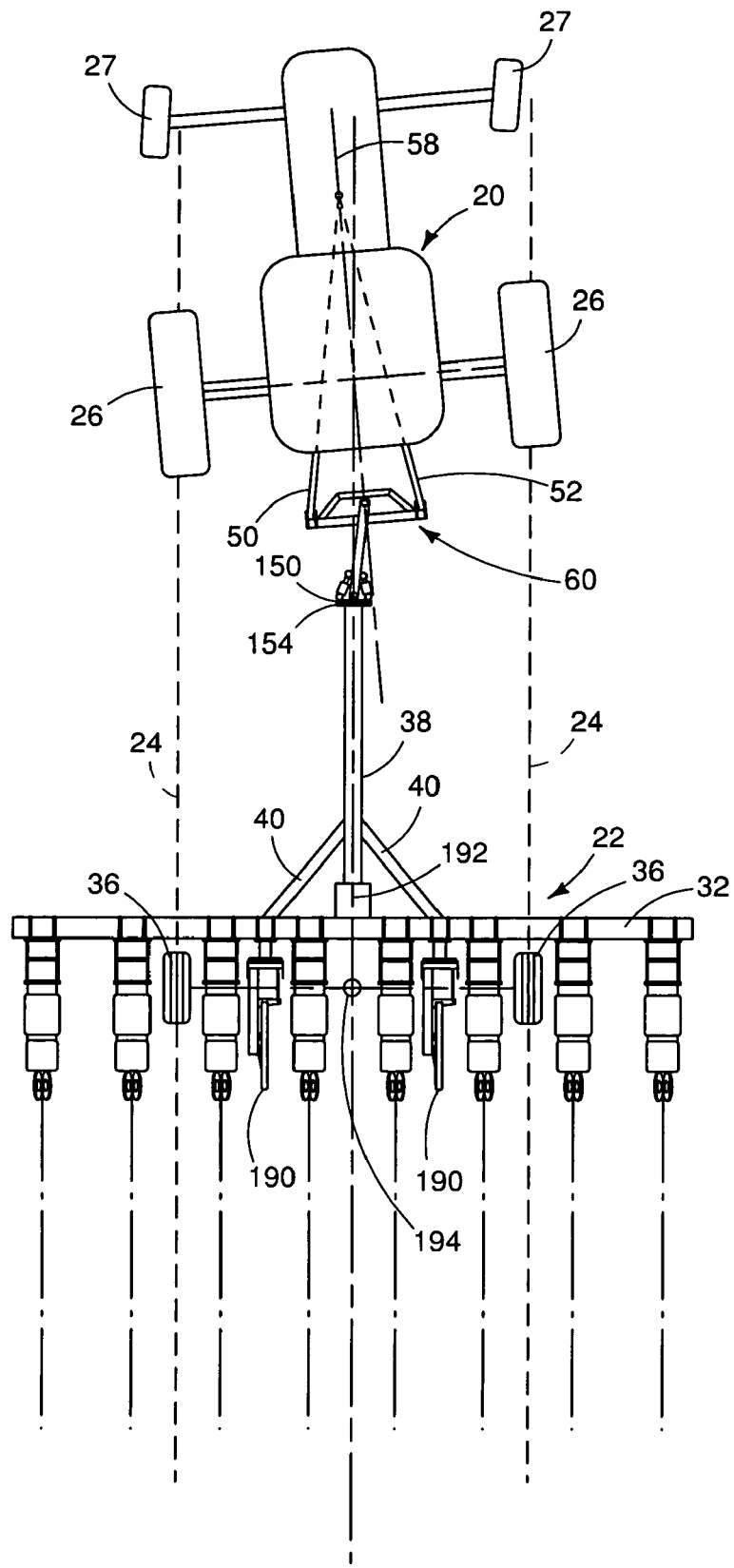
Figure 8:
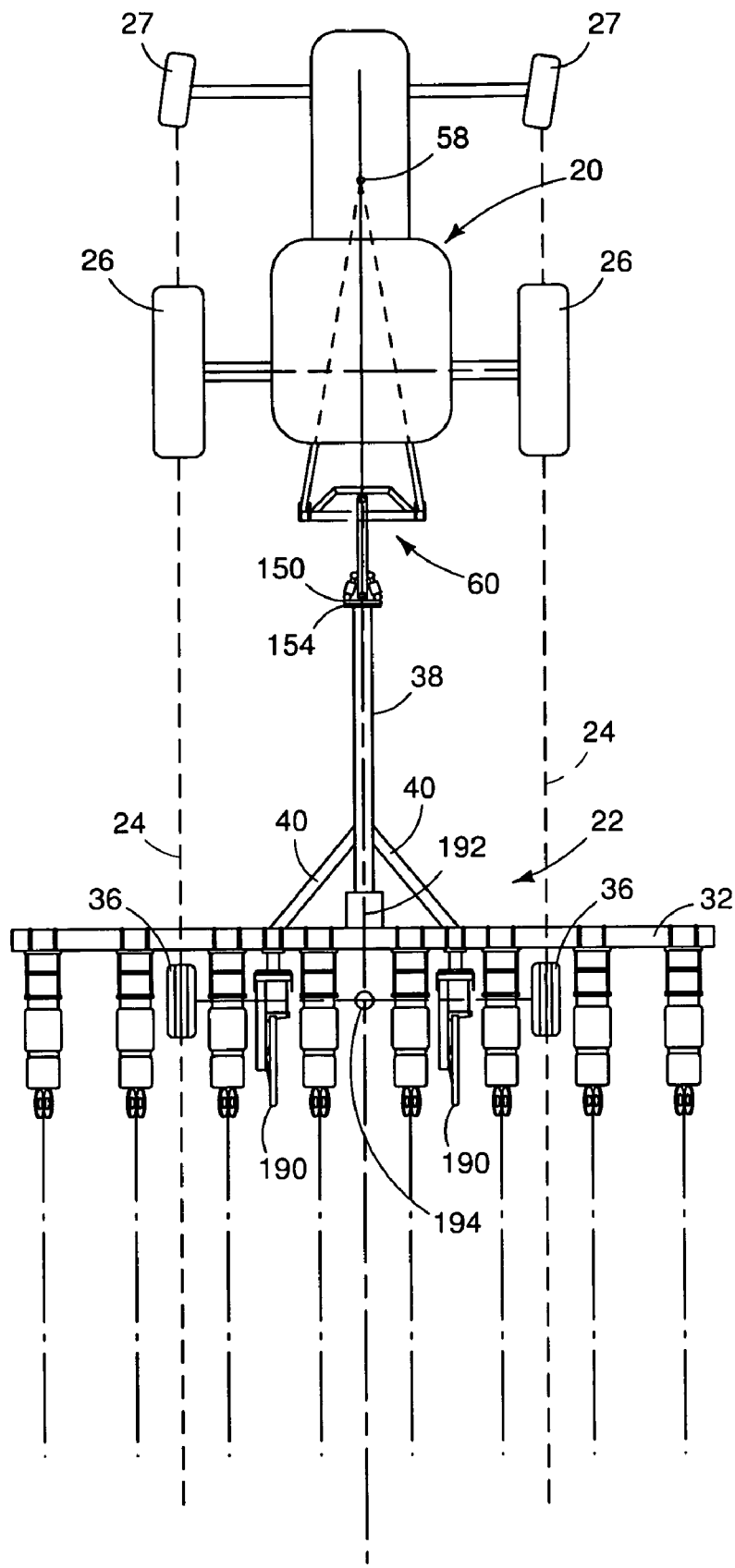
Figure 9:
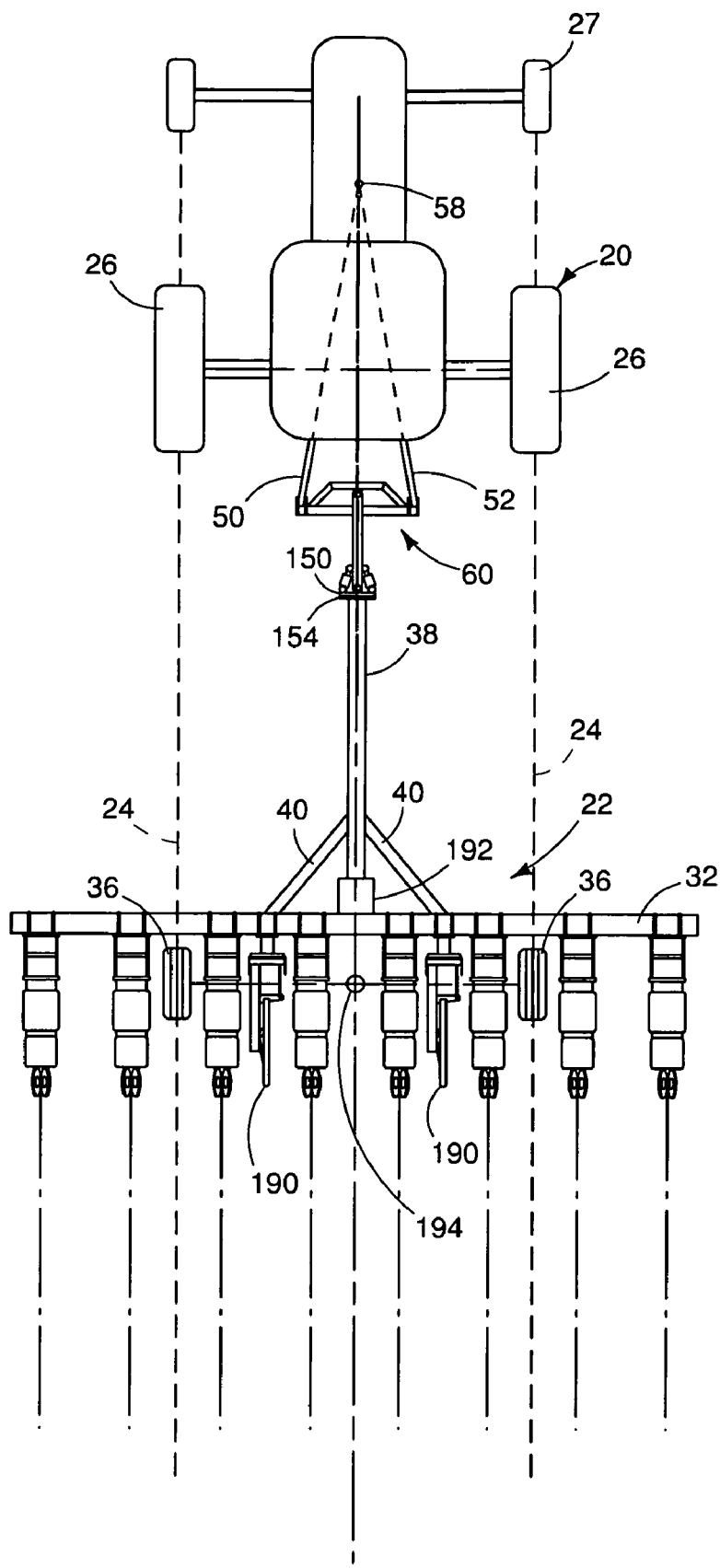

In FIG. 7, with the tractor rear wheels on track, the driver turns the front wheels 27 to the right so that the front wheels will also be on track and the hydraulic hitch mechanism 60 makes the angular adjustment so that the implement 22 continues to stay on track while the tractor straightens out. In FIG. 8, the front wheels have returned to be on track as are the rear wheels and the hydraulic hitch mechanism is substantially straight. In the final drawing of the sequence shown in FIG. 9, the driver straightens out the front wheels 27 and the front wheels, rear wheels and the implement are all aligned in perfect running orientation.

With regard to the GPS system that is to be used in the system of the present invention, it should be understood that the present invention utilizes a GPS system, rather than having invented it. There are several types of GPS systems that have been developed and marketed and which have been employed in implementations relating to agricultural applications. Some of the systems that have been utilized to date include the RTK (Real Time Kinematics) system that uses a base station and GPS to typically provide a ±1" accuracy. Other systems that may be used include the DGPS HP (Differential GPS High Performance) system that typically provides accuracy to ±4". This version utilizes GPS satellite signals for basic location information and requires at least an OmniSTAR HP satellite correction signal subscription for each system. Other systems include a DGPS (Differential GPS) system that typically provides accuracy to approximately ±10". This version utilizes GPS satellite signals for basic location information and requires at least an Omni-STAR VBS satellite correction signal subscription for each system or the pre-WAAS signal which is differentiated by the source of correction signal.

It is preferred that the system used with the present invention be the most accurate possible. Because a cultivator, for example, can cut plants from rows as a result of a deviation of only a few inches, the RTK system which has a ±1" accuracy is preferred over the other above-described systems. To the extent that other systems exist which are more accurate than ±1", they are preferred for the reason that such close tolerances can be very important with regard to the successful operation of a guidance system in certain applications.

Since the present invention controls the implement along the preferred paths, a GPS antenna and control module 192 is preferably located on the implement and more particularly on the center of the tool bar 32 of the implement 30. However, it should be understood that it may be located away from center provided offsets are calculated as may be necessary. It may also be beneficial to have the GPS antenna 192 mounted on a structure that is forward of the tool bar by a few inches or more so that some lead time in the position of the path is gained, which would enable timely correction of the path of the implement.

Although not shown, it should be understood that the antenna and control module 192 are shown to be at the same location, they may be separated such as locating the control module within the cab of the tractor. The antenna must be associated with the tool bar to detect or monitor its position. Communication between the control module and the antenna 192 can be accomplished by conductors extending between the two or by a wireless communication link, such as a Bluetooth or other type of communication link.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. Apparatus for positioning a pull type farm implement which has an elongated tongue fixedly attached to an elongated transverse tool bar while being drawn by a motor vehicle moving generally along a desired path, the vehicle having a vehicle hitch on the rear end thereof configured for attachment to a front end portion of the tongue, said apparatus comprising:
    a hydraulic hitch mechanism having an elongated main frame separate from the vehicle, said mechanism including a forwardmost component configured for attachment to the vehicle hitch and being configured to pivot relative to said main frame about a first vertical axis, and a rearwardmost component connected to said main frame at an opposite end portion opposite said forwardmost component and configured to be attached to the tongue of the implement in a non-pivoting manner, said rearwardmost component being configured to pivot relative to said main frame about a second vertical axis distinct from said first vertical axis, said hitch mechanism having at least one hydraulic cylinder connected to said main frame and to said rearwardmost component of said mechanism external to said main frame for selectively adjusting the lateral position of the front end portion of the tongue relative to the vehicle hitch in a manner whereby a pull point of the motor vehicle is relatively unchanged;
    a global positioning system (GPS), said GPS including a receiver and an antenna, said antenna being mounted on the implement, said GPS being operable to detect the position of the tool bar relative to the desired path as the vehicle moves forwardly generally along the desired path and repeatedly generate signals that are indicative of said detected position; and
    means for controlling said at least one hydraulic cylinder to adjust the lateral position of the front end of the tongue so that the implement follows the desired path of movement in response to said GPS signals.

2. Apparatus as defined in claim 1 wherein the vehicle hitch is a two point hitch.

3. Apparatus as defined in claim 1 wherein said hydraulic hitch mechanism comprises:
    a vehicle mount for attachment to the motor vehicle; and
    said elongated main frame having an end portion pivotally attached to said vehicle mount in three axes.

4. Apparatus as defined in claim 3 wherein said vehicle mount comprises:
    an elongated two point mount frame having outer pin brackets with mounting pins on opposite end portions, said mounting pins being generally horizontally oriented and configured to be retained by a vehicle two point hitch, said mount frame being pivotable in a generally vertical direction relative to said vehicle two point hitch;
    a rear support frame having side portions interconnected with a bridging portion, said side portions be attached to said two point mount frame to form a pocket in which a U-joint is mounted;
    said U-joint being pivotably mounted in said pocket with at least one horizontal pin in each of said bridging portion and said two point mount frame and having at least one pin for pivotably connecting to said one end of said elongated main frame; and
    a lateral stiffener having one end attached to said vehicle mount and an opposite end attached to the motor vehicle.

5. Apparatus as defined in claim 4 wherein said lateral stiffener comprises at least first and second wide links interconnected to one another, said first link being operatively attached to said vehicle mount and said second link being operatively attached to said motor vehicle.

6. Apparatus as defined in claim 5 wherein said stiffener further comprises a drawbar plate attached to said second link, said plate being configured to be bolted to said motor vehicle.

7. Apparatus as defined in claim 5 wherein said stiffener further comprises a stiffener bracket pivotably attached to said first link, said stiffener bracket being attached to said two point mount frame.

8. Apparatus as defined in claim 4 wherein said U-joint comprises generally complementary half sections, each of which have semicircular recesses for receiving said pins, and bolts for attaching said half sections together and for securing said pins there between.

9. Apparatus as defined in claim 4 wherein the axes of said mounting pins, said horizontal pins and said vertical pins intersect at a generally common point.

10. Apparatus as defined in claim 3 wherein said rearwardmost component is a tongue mount comprising: a tongue bracket that is pivotally mounted by a generally vertical pin to said one end of said elongated main frame, said bracket having at least one flange adjacent said pin for attachment to one end of said hydraulic cylinder, whereby operation of said cylinder changes the angular position of said tongue mount relative to said main frame.

11. Apparatus as defined in claim 10 wherein said tongue mount further comprises an interface plate for connection to said tongue, said bracket having two of said flanges adjacent said pin on opposite sides thereof for attachment to one end of hydraulic cylinders on opposite sides, whereby operation of said cylinders changes the angular position of said tongue mount relative to said main frame.

12. Apparatus as defined in claim 11 wherein said tongue has a tongue interface plate on said front end of said tongue configured to be attached to said tongue bracket interface plate.

13. Apparatus as defined in claim 1 wherein said main frame is a unitary steel structure having spaced apart upper, middle and lower struts, interconnected by structural struts, and including a rear support frame having side portions interconnected with a bridging portion, said side portions be attached to a two point mount frame to form a pocket in which a U-joint is mounted, with the forward ends of the lower and middle struts extending over said pocket and being attached to said U-joint.

14. Apparatus as defined in claim 3 further comprising first sensing means for sensing the angular orientation of said main frame relative to said rearwardmost component and generating a first orientation signal indicative of said sensed orientation which is transmitted to said means for controlling said hydraulic hitch mechanism.

15. Apparatus as defined in claim 14 wherein said first sensing means produces a first position signal that is indicative of the position of the motor vehicle relative to the desired path.

16. Apparatus as defined in claim 1 wherein said motor vehicle is a farm tractor.

17. A hydraulic hitch mechanism for a pull type agricultural implement having an elongated tongue fixedly attached to an elongated transverse tool bar, said mechanism being configured to be attached to a vehicle hitch of a motor vehicle and comprising:
- a vehicle mount for attachment to the motor vehicle;
- a rearwardmost component for non-rotational attachment to the front end portion of the tongue of the farm implement;
- an elongated main frame separate from the vehicle and having one end portion pivotally attached to said vehicle mount in a first vertical axis and an opposite end portion configured to pivot relative to said rearwardmost component about a second generally vertical axis distinct from said first vertical axis;
- at least one hydraulic cylinder connected to said main frame and to said rearwardmost component on said mechanism external of said main frame for controlling the generally horizontal angular orientation of said rearwardmost component and the implement relative to said main frame.

18. A method of maintaining a centered pull point of a motor vehicle with a vehicle hitch for pulling a farm implement having a tongue fixedly and non-rotationally attached to a transverse tool bar when the rear end of the motor vehicle pulling the farm implement becomes laterally offset relative to a desired path the motor vehicle is intending to traverse, comprising the steps of:
- providing a hydraulic hitch mechanism having an elongated main frame separate from the vehicle, said mechanism having a forwardmost component attached to the vehicle hitch being configured to pivot relative to one end of said main frame about a first vertical axis, and an opposite end portion configured to be pivotably attached about a second vertical axis distinct from the first vertical axis to a rearwardmost component that is attached to the tongue of the implement in a non-pivoting manner; and
- the hydraulic hitch mechanism moving a front end of the tongue in a direction opposite the direction that created the lateral offset by an amount generally equal to the amount of said offset.

19. The method of claim 18 wherein said hydraulic hitch mechanism includes at least one hydraulic cylinder that interconnects said main frame and said rearwardmost component.

20. The method of claim 19 wherein said at least one hydraulic cylinder controllably pivots the rearwardmost component relative to the main frame for moving the front end of the tongue.

* * * * *